United States Patent
Sansone (10) Patent No.: US 7,386,457 B2
(45) Date of Patent: Jun. 10, 2008

(54) MESSAGING SERVICES FOR THE VISUALLY IMPAIRED

(75) Inventor: Ronald P. Sansone, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 1469 days.

(21) Appl. No.: 09/817,998

(22) Filed: Mar. 27, 2001

(65) Prior Publication Data

US 2002/0143715 A1  Oct. 3, 2002

(51) Int. Cl.
*G06Q 10/00* (2006.01)

(52) U.S. Cl. .......................................................... 705/1

(58) Field of Classification Search .................... 705/1, 705/400, 401, 402, 404, 406, 409, 410, 500
See application file for complete search history.

(56) References Cited

U.S. PATENT DOCUMENTS

| | | | | |
|---|---|---|---|---|
| 4,037,956 | A | * | 7/1977 | McKeen, Jr. ................. 355/77 |
| 4,962,532 | A | * | 10/1990 | Kasiraj et al. ................. 380/25 |
| 5,031,223 | A | | 7/1991 | Rosenbaum et al. |
| 5,079,714 | A | | 1/1992 | Manduley et al. |
| 5,086,300 | A | | 2/1992 | Ashmore |
| 5,115,326 | A | | 5/1992 | Burgess et al. |
| 5,293,250 | A | | 3/1994 | Okumura et al. |
| 5,400,335 | A | | 3/1995 | Yamada |
| 5,612,889 | A | | 3/1997 | Pintsov et al. .......... 364/478.14 |
| 5,648,916 | A | | 7/1997 | Manduley ................. 364/514 A |
| 5,737,729 | A | | 4/1998 | Denman |
| 5,790,790 | A | | 8/1998 | Smith et al. |
| 5,825,865 | A | | 10/1998 | Oberlander et al. |
| 5,838,768 | A | | 11/1998 | Sumar et al. ................. 379/89 |
| 5,862,223 | A | | 1/1999 | Walker et al. |
| 5,872,926 | A | | 2/1999 | Levac et al. |

(Continued)

FOREIGN PATENT DOCUMENTS

CA  1178711 A  11/1984

(Continued)

OTHER PUBLICATIONS

Pitney Bowes Inc. Software Solutions regarding ReUnion™ Data Quality to a New Level dated 1998.

(Continued)

*Primary Examiner*—Igor N Borissov
(74) *Attorney, Agent, or Firm*—Ronald Reichman; Angelo N. Chaclas (57) ABSTRACT

A method that enables the recipient to receive notification of the mailpieces, flats and/or packages (mail) that the recipient is going to receive prior to the delivery of the mail. The recipient is then able to inform a post or courier i.e., Federal Express®, Airborne®, United Parcel Service®, DHL®, etc. of the manner in which the recipient would like the mail delivered. The post and courier will hereinafter be referred to as "carrier". For instance, the recipient may want the mail physically delivered to their house faster or slower, or the mail physically redirected to the recipient's temporary address, or physically delivered to the recipient's agent, or physically delivered to the recipient's attorney, or physically returned to the mailer, or have the carrier open the physical mail and have the post e-mail or fax the contents of the envelope to the recipient and/or parties designated by the recipient.

2 Claims, 7 Drawing Sheets

U.S. PATENT DOCUMENTS

| | | | |
|---|---|---|---|
| 5,943,408 | A | 8/1999 | Chen et al. |
| 5,944,786 | A | 8/1999 | Quinn |
| 5,974,449 | A * | 10/1999 | Chang et al. ............... 709/206 |
| 5,987,508 | A | 11/1999 | Agraharam et al. |
| 6,020,980 | A | 2/2000 | Freeman |
| 6,044,362 | A | 3/2000 | Neeley |
| 6,047,272 | A * | 4/2000 | Biliris et al. ................ 705/400 |
| 6,052,442 | A | 4/2000 | Cooper et al. |
| 6,058,420 | A | 5/2000 | Davies |
| 6,061,448 | A | 5/2000 | Smith et al. |
| 6,061,790 | A | 5/2000 | Bodnar |
| 6,064,995 | A | 5/2000 | Sansone et al. |
| 6,072,862 | A | 6/2000 | Srinivasan ............. 379/100.08 |
| 6,073,165 | A | 6/2000 | Narasimhan et al. |
| 6,081,899 | A | 6/2000 | Byrd |
| 6,085,231 | A | 7/2000 | Agraharam et al. |
| 6,108,688 | A | 8/2000 | Nielsen |
| 6,259,533 | B1 | 7/2001 | Toyoda et al. |
| 6,273,267 | B1 | 8/2001 | Tamamoto et al. |
| 6,285,777 | B2 | 9/2001 | Kanevsky et al. |
| 6,289,323 | B1 * | 9/2001 | Gordon et al. ............... 705/401 |
| 6,293,037 | B1 * | 9/2001 | Spada et al. .................. 40/638 |
| 6,321,211 | B1 | 11/2001 | Dodd |
| 6,333,973 | B1 | 12/2001 | Smith et al. |
| 6,343,327 | B2 | 1/2002 | Daniels, Jr. et al. |
| 6,347,305 | B1 | 2/2002 | Watkins |
| 6,390,921 | B1 * | 5/2002 | Busch et al. .................. 463/42 |
| 6,405,319 | B1 | 6/2002 | Arnold et al. |
| 6,411,393 | B1 | 6/2002 | Wakasugi |
| 6,427,164 | B1 | 7/2002 | Reilly |
| 6,434,603 | B1 | 8/2002 | Tsuji et al. |
| 6,527,170 | B1 | 3/2003 | Gordon et al. |
| 6,527,178 | B1 | 3/2003 | Gordon et al. |
| 6,532,489 | B1 | 3/2003 | Merchant |
| 6,542,584 | B1 * | 4/2003 | Sherwood et al. ........ 379/88.18 |
| 6,549,612 | B2 | 4/2003 | Gifford et al. |
| 6,604,132 | B1 | 8/2003 | Hitt |
| 6,621,892 | B1 | 9/2003 | Banister et al. |
| 6,647,385 | B2 | 11/2003 | Seestrom et al. |
| 6,697,858 | B1 | 2/2004 | Ezerer et al. |
| 6,710,894 | B1 | 3/2004 | Ogawa |
| 6,711,154 | B1 | 3/2004 | O'Neal |
| 6,721,784 | B1 | 4/2004 | Leonard et al. |
| 6,741,724 | B1 | 5/2004 | Bruce et al. |
| 6,785,710 | B2 | 8/2004 | Kikinis |
| 6,842,772 | B1 | 1/2005 | Delaney et al. |
| 2001/0021261 | A1 | 9/2001 | Koga et al. |
| 2002/0002590 | A1 * | 1/2002 | King et al. ................... 709/206 |
| 2002/0042808 | A1 | 4/2002 | Smith et al. |
| 2002/0095306 | A1 | 7/2002 | Smith et al. |
| 2002/0165729 | A1 * | 11/2002 | Kuebert et al. ................. 705/1 |

FOREIGN PATENT DOCUMENTS

| | | |
|---|---|---|
| DE | 197 45 641 A1 | 11/1999 |
| EP | 0 465 011 A2 | 1/1992 |
| EP | 1 063 602 A1 | 12/2000 |
| WO | WO 0375139 * | 6/1990 |
| WO | WO 99/21330 | 10/1998 |
| WO | WO 02/01434 A1 | 1/2002 |
| WO | WO 02/42979 A1 | 2/2002 |

OTHER PUBLICATIONS

Pitney Bowes Inc. Software Solutions regarding Final Focus™ Your Single Source for Geographic, Demographic and Lifestyle Information dated 1998.

The Session Initiation Protocol: Internet-Centric Signaling—Schulzrinne, et al. (2000); www.cs.columbia.edu/-jdrosen/papers/commag_final.pdf.

Turms: A Non-invasive Certified Email System—Nita-Rotaru; www.cnds.jhu.edu/-crisn/papers/turms.ps.gz.

EmailValet: Learning User Preferences for Wireless Email—Mackassy, Dayanik, Hirsh (1999); www.ai.cs.uni-dortmund.de/EVENTS/IJCA199-MLIF/papers/macscassy.ps.gz.

Formal Development of Secure Email—Shou, Kuo, Older, Chin (1999); web.syr.edu/-dzhou/papers/hicss99.ps.gz.

Practical Protocols For Certified Electronic Mail—Deng, Gong, Lazar, Wang (1996); java.sun.com/people/gong/papers/certified-email.ps.gz.

Post: A secure, resilient, cooperative messaging system—Alan Mislove Ansley; www.usenix.org/events/hotos03/tech/full_papers/mislove/mislove.pdf.

Formal Analysis of a Secure Communication Channel: Secure . . . -Dan Zhou; ocelot.cat.syr.edu/-danzhou/papers/fm99.ps.

www.PeopleFinderNow.com, Skip Tracing and People Locates, pp. 1-6.

Pace, Andrew "It's A Matter of Privacy", Jun. 2001, The Gale Group.

Wattendorf, George, "Stalking Investigation Strategies", Mar. 2000, FBI Law Enforcement Bulletin, Dialog No. 04717583.

Graham, Robert, Carnivore FAQ (Frequently Asked Questions), www.robertgraham.com/pubs/carnivore-faq.html.

An Efficient Implementation Scheme of Concurrent Object-Oriented Languages on Stock Multicomputers-Taura et al. (1993): ftp.vl.is.s.u-tokyo.ac.ip/pub/papers/ppopp93-multicomputer-letter.ps.gz.

Pin-down Cache: A Virtual Memory Management Technique for Zero-copy Communication—Tezuka, et al. (1998); www.rwcp.or.jp/pm/../papers/tr97006.ps.gz.

Linux Magazine I Jul. 1999 I Features I Secrets Inside the Linux Kernel Revealed; www.linux-mag.com/1999-07/kernel_03.html.

* cited by examiner

MESSAGING SERVICES FOR THE VISUALLY IMPAIRED

CROSS REFERENCE TO RELATED APPLICATIONS

Reference is made to commonly assigned patent applications Ser. No. 09/811,792 filed Mar. 27, 2001 entitled "Recipient Elected Messaging Services" in the names of Ronald P. Sansone, Robert A. Cordery and Donald G. Mackay; ser. No. 09/818,721 filed Mar. 27, 2001, entitled "Sender Elected Messaging Services" in the names of Ronald P. Sansone, Robert A. Cordery and Donald G. Mackay; Ser. No. 09/818,800 filed Mar. 27, 2001. entitled "Messaging Services For Uniquely Identified Mail" in the name of Ronald P. Sansone; Ser. No. 09/818,480 filed Mar. 27, 2001 entitled "Recipient Elected Messaging Services For Mail That Is Transported In Trays Or Tubs" in the name of Ronald P. Sansone; Ser. No. 09/818,195 filed Mar. 27, 2001, entitled "Method For Determining If Mail Contains Life Harming Materials" in the name of Ronald P. Sansone; Ser. No. 09/818,727 filed Mar. 27, 2001. entitled "Method For A Carrier To Determine The Location Of A Missing Person" in the name of Ronald P. Sansone; and Ser. No. 10/703,651 filed Nov. 7, 2003, entitled "Recipient Elected Messaging Services Enabled By Processing Codes Printed On Mail" in the names of Ronald P. Sansone, Robert A. Cordery, Donald G. Mackay, John W. Sussmeier, Kevin W. Bodie, Frederick W. Ryan, Jr., and Douglas B. Quine.

FIELD OF THE INVENTION

The invention relates generally to the field of mail delivery systems and, more particularly, to systems that may deliver mail by physical and/or electronic means.

BACKGROUND OF THE INVENTION

People have directly transmitted information from one person to another. Information was first transmitted by spoken word and later by the written word. Writings enabled people to transmit information by messengers from a location in which the sender of the writing was present to another location where the receiver was present. In time, postal services were developed in which a person would deliver a letter to the post office in one city, and an agent of the post office would deliver that letter to a post office in another city where the letter would be picked up by the person to whom the letter was sent.

Ever since the numeric codification of streets and buildings received general acceptance, an individual's name and household postal addresses have been linked. The sender of a letter or package would deliver a letter or package to the post that had the correct recipient postal address, and the post would deliver the letter or package to the numeric street address of the recipient of the letter or package. A correct recipient postal address for the delivery of the letter or package to the recipient included the name of the recipient, the street address of the recipient, the city and state of the recipient, and the zip code of the recipient. Thus, the correct recipient postal address is usually the actual location of the recipient.

Typically, it takes the post three to five days to deliver letters and/or packages to a recipient. Sometimes, recipients of letters and packages like to know what letters and packages they are going to receive before they receive them. For instance, if someone is going on a trip, they may want to receive their bills, i.e., credit card, electric, gas, oil, hospital, doctor, etc., before they leave on the trip so that they may pay the bills before a finance charge for late payment is applied to their account. Someone may also want to receive a package before they go on a trip so that they may take the contents of the package on the trip. The recipient may also want to delay delivery of a particular letter or package until they return from their trip. The reason for the foregoing may be that the recipient does not want to retrieve the letter or package at the post office or have the letter or package waiting at a vacant house.

SUMMARY OF THE INVENTION

This invention overcomes the disadvantages of the prior art by providing a method that enables a recipient who may be visually impaired to receive notification of the letters and/or packages (mail) that the recipient is going to receive prior to the delivery of the mail. The recipient is then able to inform a post or courier i.e., Federal Express®, Airborne®, United Parcel Service®, DHL®, etc., of the manner in which the recipient would like the mail delivered. The post and courier will hereinafter be referred to as "carrier". For instance, the recipient may want the mail physically delivered to their house faster or slower, or the mail physically redirected to the recipient's temporary address, or physically delivered to the recipient's agent, or physically delivered to the recipient's attorney, or physically returned to the mailer, or have the carrier open the physical mail and have the carrier e-mail or fax the contents of the letter to the recipient and/or parties designated by the recipient.

This invention accomplishes the foregoing by depositing with the carrier mail containing the recipient's name and physical address and the sender's name and address; translating the name and physical address of the recipient into a telephone number; utilizing the telephone number of the recipient to inform the recipient of the availability of the deposited mail notifying the recipient via e-mail of the availability of the deposited mail; notifying the carrier via e-mail of the manner in which the recipient would like the mail delivered; and delivering mail to the recipient in the manner specified by the recipient to the carrier.

DETAILED DESCRIPTION OF THE PREFERRED EMBODIMENT

Figure 1A:
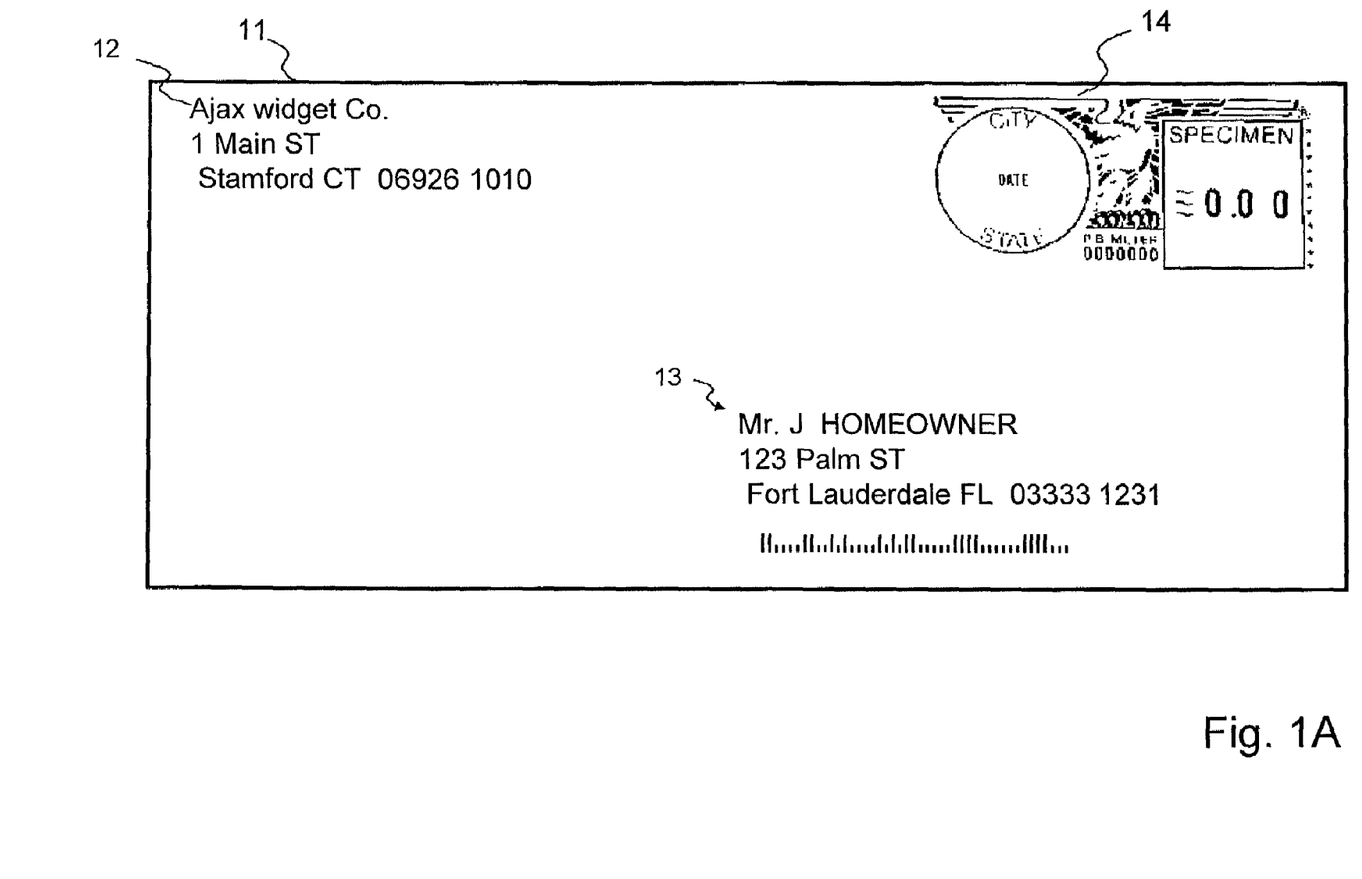
FIG. 1A is a drawing of a metered mailpiece.

Referring now to the drawings in detail and more particularly to FIG. 1A, the reference character 11 represents a mailpiece that has a sender address field 12, a recipient address field 13 and a postal indicia 14.

Figure 1B:
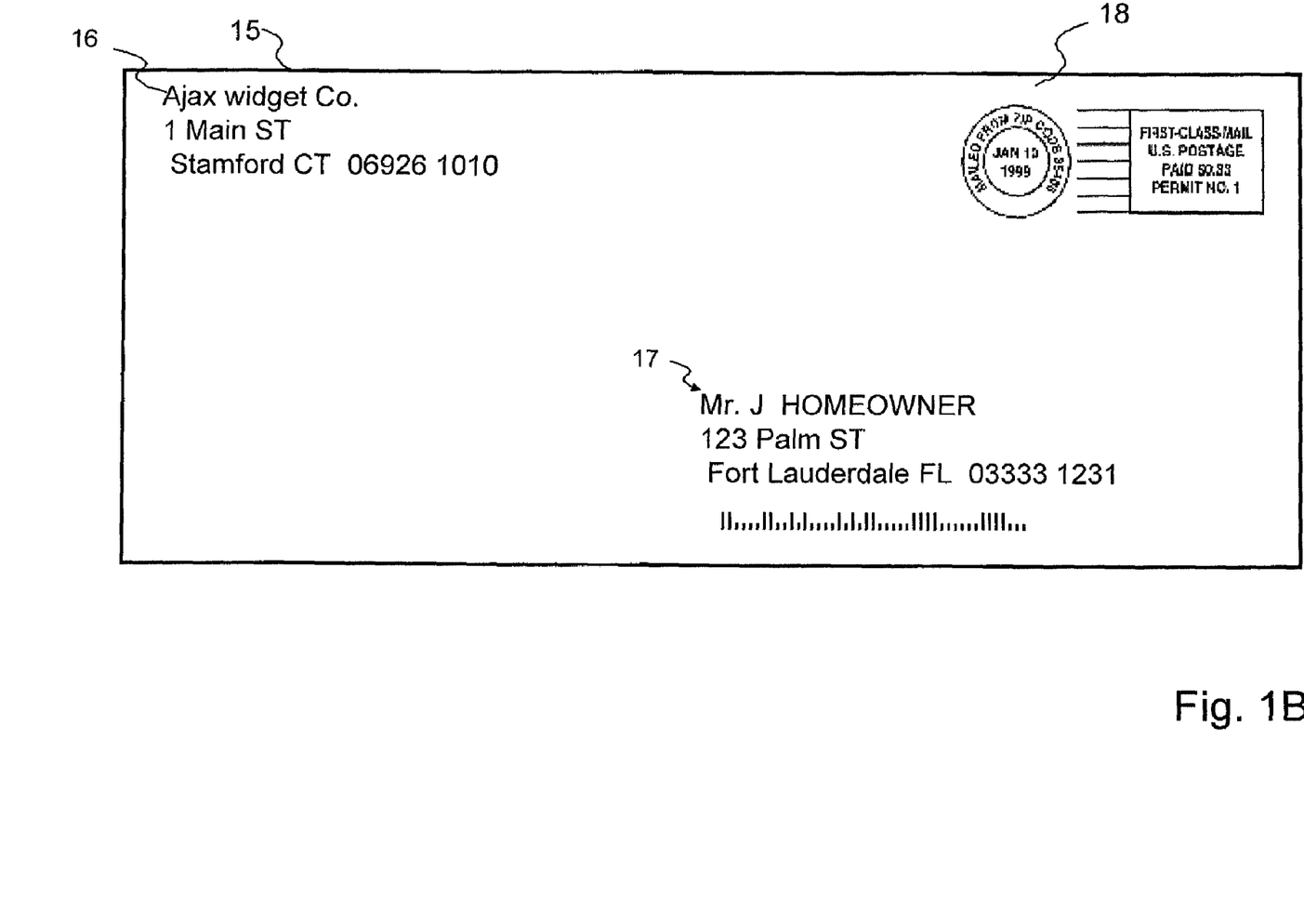
FIG. 1B is a drawing of a permit mailpiece.

FIG. 1B is a drawing of a permit mailpiece. Mailpiece 15 has a sender address field 16, a recipient address field 17 and a permit 18.

Figure 1C:
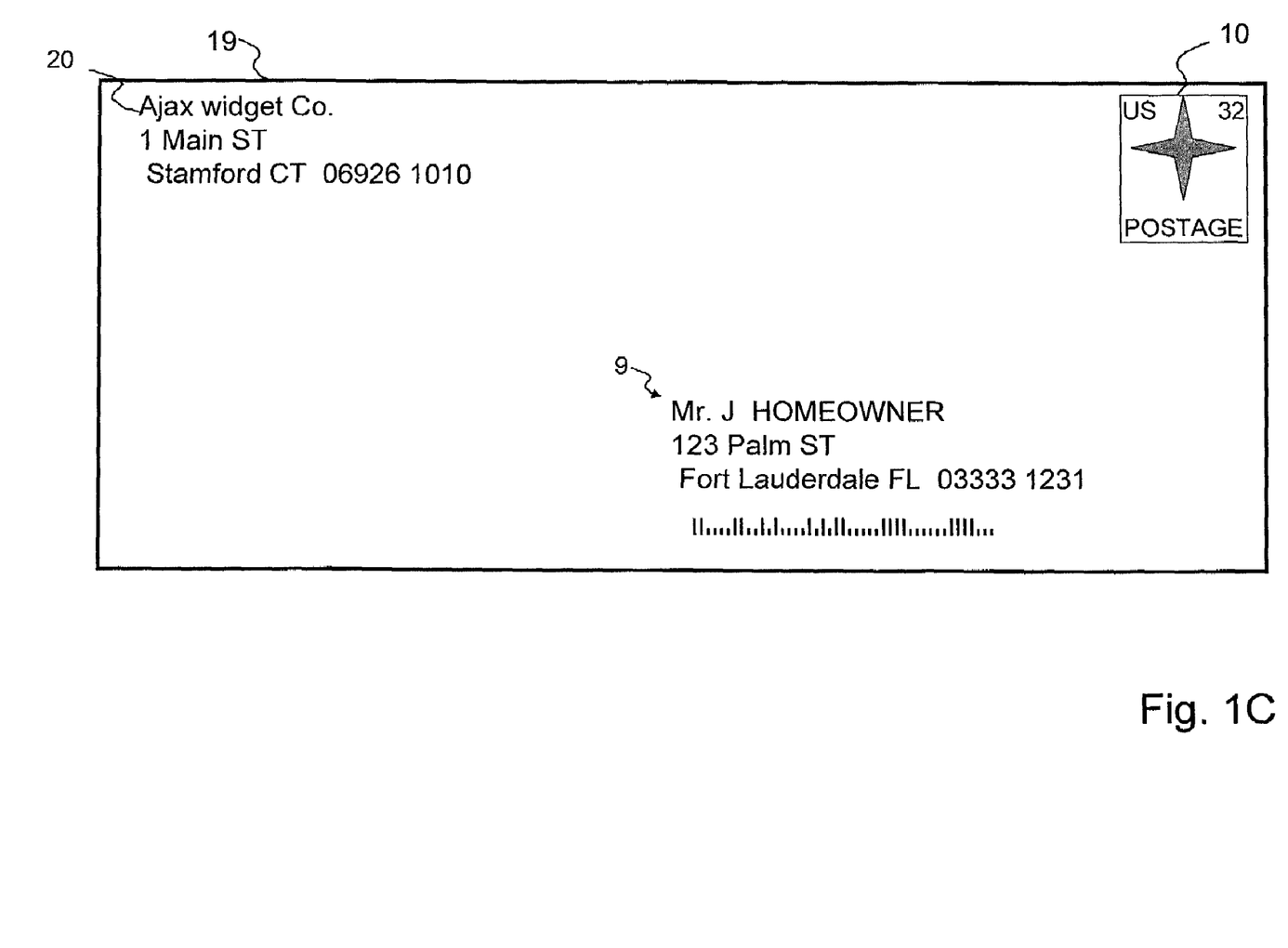
FIG. 1C is a drawing of a stamped mailpiece.

FIG. 1C is a drawing of a stamped mailpiece. Mailpiece 19 has a sender address field 20, a recipient address field 9 and a stamp 10.

Figure 1D:
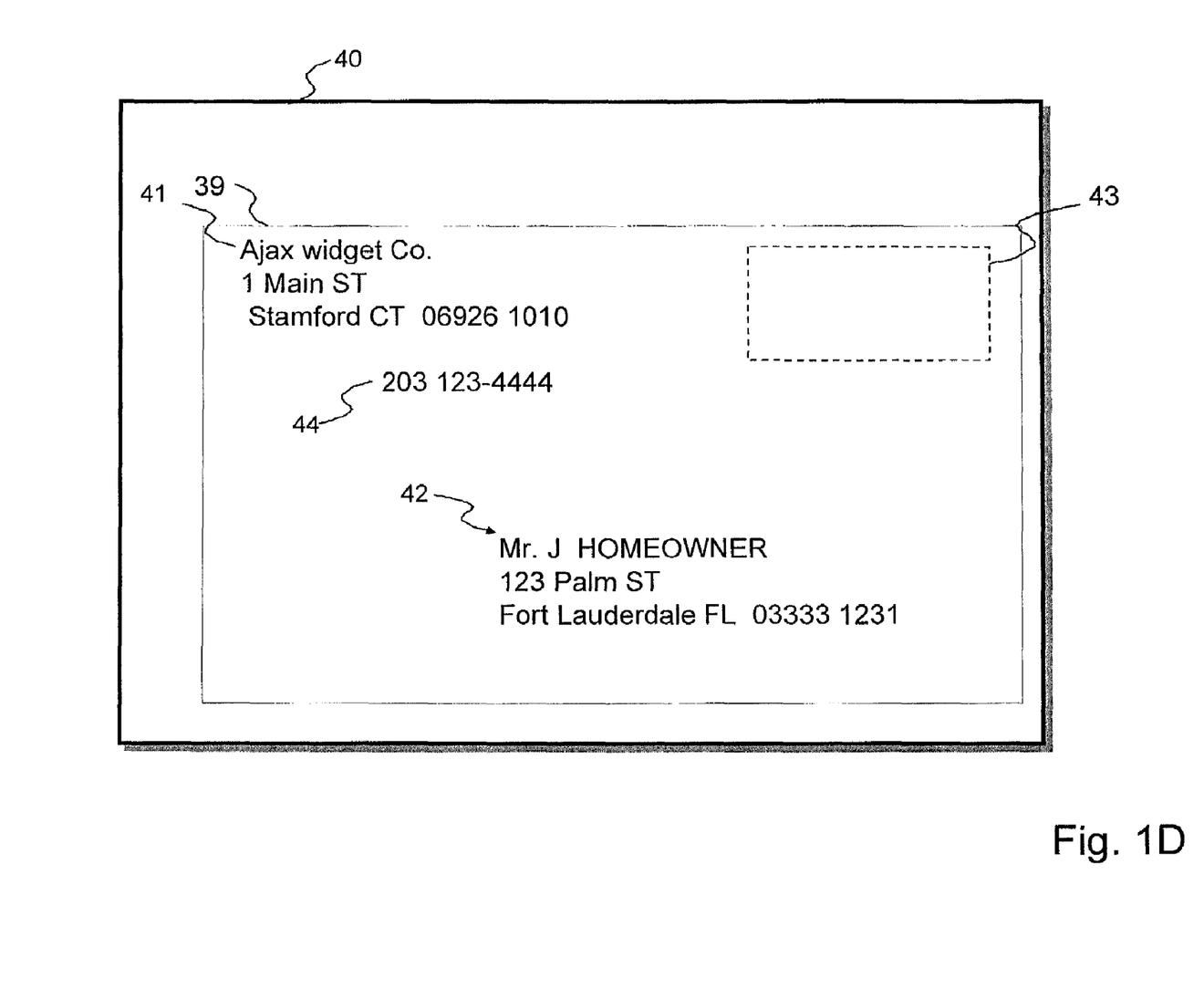
FIG. 1D is a drawing of a flat or package that is going to be delivered by a carrier.

FIG. 1D is a drawing of a flat or package that is going to be delivered by a carrier. Package 40 has a label 39 affixed thereto. Label 39 has a sender address field 41, a recipient address field 42 and may have other sender information, i.e., the sender's phone number 44. Indicia 43 is affixed to label 39. Indicia 43 may be a postal indicia or courier symbology.

Figure 2:
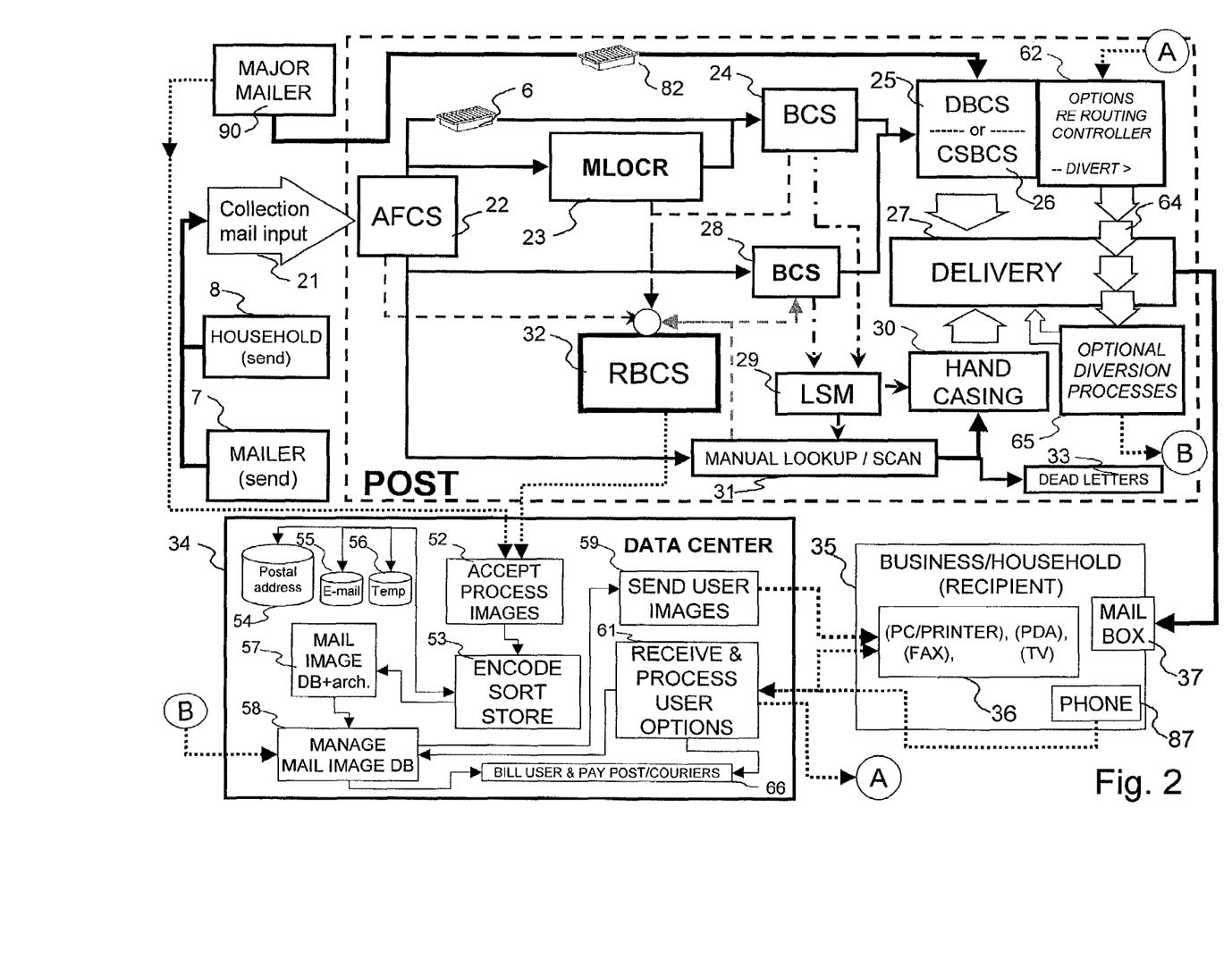
FIG. 2 is a drawing showing how this invention may be used by a post in the processing of letters.

FIG. 2 is a drawing showing how this invention may be used by a post in the processing of letters. Letter mail that is deposited in trays 6 and delivered to the post is read by multiple optical character reader (hereinafter "MLOCR") 23. Collection letter mail may be metered letter mail that is produced at a major mailer site 7 or a sender household 8 by a postage meter or a personal computer meter, stamped mail, or, permit mail. Collection letter mail is placed in collection mail input 21, i.e., mail boxes or delivered unsorted to the United States Postal Service. Collection letter mail is sent to AFCS 22. AFCS 22 first faces the letter mail. Then AFCS 22 electronically identifies and separates prebarcoded mail, handwritten addresses and machine-imprinted address pieces for faster processing through automation. Letter mail that AFCS 22 determines is optical character readable is sent to MLOCR 23. Reader 23 reads the entire address on the letter mail, sprays a bar code on the mail, and then sorts the mail. Letter mail that is able to be scanned and sorted by reader 23 is sent to bar code sorter/code printer (hereinafter "BCS") 24. Letter mail that the mailer has prebarcoded and contains a facing identification mark is sent to bar code sorter/code printer 24.

Figure 4:
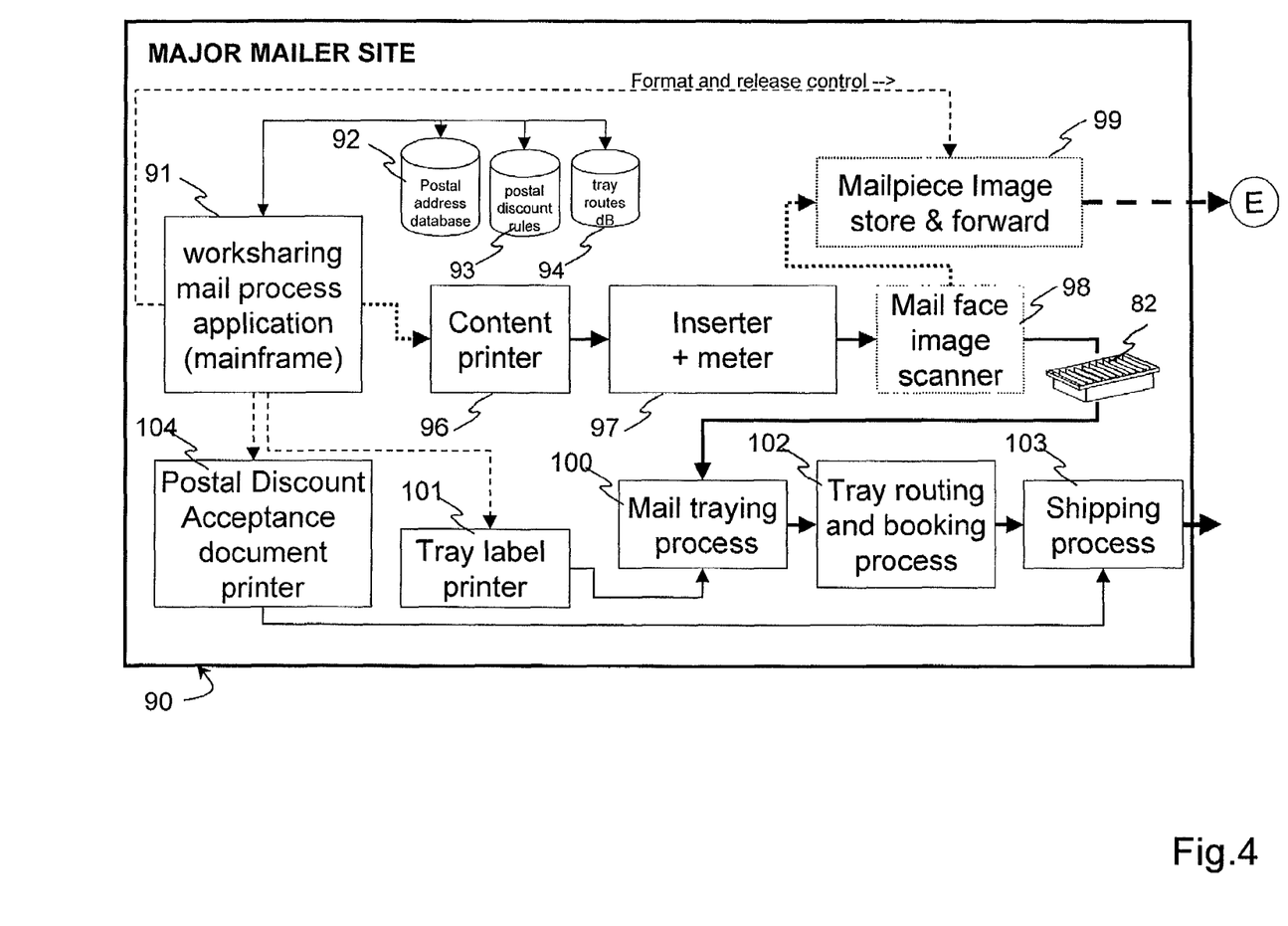
FIG. 4 is a drawing of major mailer site 90.

Trayed mail 82 (mail in which the sender is entitled to discounts) that is produced at a major mailer site 90 (FIG. 5) is sent to a delivery bar code sorter/code printer (hereinafter "DBCS") 25 or a carrier sequence bar code sorter/code printer (hereinafter "CSBCS") 26. Sorters 25 and 26 sort the letter mail in the order that the mail is going to be delivered by postal carrier 27. Letter mail that AFCS 22 determines is not optical character readable is sent to bar code sorter/code printer (hereinafter "BCS") 28. Letter mail that AFCS 22 obtains electronic images from and letter mail that reader 23 obtains electronic images from will be sent to remote bar code system 32. Bar code system 32 matches the look up zip code for the letter mailpieces from AFCS 22 and merges them. System 32 electronically transmits the bar code information to BCS 28 where the bar code information is sprayed on the mailpieces. Letter mail that is able to be scanned and sorted by sorters 24 and 28 is sent to a delivery bar code sorter 25. Sorters 25 and 26 sort the letter mail in the order that the mail is going to be delivered by postal carrier 27, or hold the mail for recipient diversion for a specified period of time in divert mail options rerouting controller 62.

Letter mail that can not be scanned and sorted by sorters 24 and 28 is sent to letter sort machine 29. Letter mail that can be sorted by letter sort machine 29 is sent to postal hand casing 30. Postal hand casing 30 is the process in which the postal carrier sorts the letter mail in the order that the letter mail is going to be delivered by postal carrier 27. Letter mail that can not be sorted by letter sort machine 29 is sent to manual process 31. Manual process 31 attempts to classify the previously rejected mailpiece to redirect the mailpiece; declare the mailpiece dead; or manually re-code the mailpiece for redelivery. Then the mailpieces that have not been processed in manual lookup sortation process 31 are sent to dead letters 33. In process 31, an operator may determine the address of the recipient and produce a label to be placed on the letter mail. Then the letter mail would go to postal hold casing 30 where the mail is sorted in the order that the mail is going to be delivered by postal carrier 27.

Letter mail that can not be faced and cancelled by AFCS 22 is sent to manual process 31. Manual process 31 attempts to classify the previously rejected letter mailpiece to redirect the mailpiece; declare the mailpiece dead; or manually re-code the mailpiece for redelivery. Then the letter mail that manual process 31 is able to classify is sent to postal carrier casing 30 before it is delivered by postal carrier 27.

RBCS 32 electronically transmits the bar code information that represents the destination of the letter mailpiece and the party to whom the mailpiece is to be delivered and the image of the face of the mailpiece to data center 34. The aforementioned scanners scan all of the information appearing on the face of the letter, i.e., the sender's name and address 12 (FIG. 1A), the recipient's name and address 13, and postal indicia 14. The scanned information is transferred to accept process images 52. Then the information is sent to encode, sort, store 53. At this point, the recipient's physical address is verified by checking postal address data base 54, and the recipient's e-mail address is determined from e-mail data base 55, and the recipient's telephone number and/or tactile communication device phone number are determined from voice data base 104. Temporary data base 56 is then searched to determine whether or not the recipient has left any forwarding addresses. Encode 53 then encodes and sorts the information obtained from data bases 54, 55 and 56.

The aforementioned encoded and sorted information is stored in mail image data base 57. Then the mail image information is sent to manage mail image 58 where the various options and the costs associated therewith that the recipient may have for delivering the information contained in the letter are determined. Then the mail images and options that the recipient has for receiving the mail are sent to speech conversion process 89, where the information appearing on the face of the mail and the options the recipient has for receiving the mail are converted to speech. The speech is transmitted to telephone 87 and/or tactile communications device 88, which is located at the recipient's business or household 35.

The recipient may use telephone 87 and/or tactile communications device 88, located at the recipient's business or household 35 to inform receive and process recipient options 61, located at data center 34, of the manner in which the mail should be delivered. For instance, the recipient may want the mail physically delivered to the recipient's house faster or slower, or the mail physically redirected to the recipient's temporary address, or physically delivered to the recipient's agent, or physically delivered to the recipient's attorney, or physically returned to the mailer, or have the post open the mail and have the post e-mail or fax the contents of the mail to the recipient and/or parties designated by the recipient, or have the post open the mail and pay the invoice or bill in the mail with monies in an account established by the recipient or charge the invoice or bill to the recipient's credit card.

At this juncture, the recipient may inform options 61 via a device 36 of the manner in which the recipient would like the mailpiece processed. Options 61 will then inform the recipient via device 36 of the cost to the recipient to process the mailpiece in the manner selected by the recipient. The recipient may then inform the post to deliver the mailpiece in the manner selected by the recipient. The recipient's selected manner of mailpiece processing is forwarded to options rerouting controller 62. If the post specified time to deliver the mailpiece has not been reached, the mailpiece is sent to recipient options 64 and delivered in the manner selected by the recipient in route mail options 65. Then options 65 informs manage mail data base 58 to archive the image and also to notify bill sender and pay carriers 66 to bill the recipient and pay the post. At this point the next mailpiece image is ready to be processed.

The mailpiece may then be delivered to the recipient at mail box 37 at a faster or slower rate than that selected by the sender; held by the post for a specified amount of time and then delivered to an address specified by the recipient; opened, and the contents of the mailpiece faxed to recipient's selected fax numbers; opened, and the contents of the mailpiece faxed to recipient's selected fax numbers, and then the mailpiece may be delivered to the physical address specified by the recipient; opened, and the contents of the mailpiece e-mailed to recipient's selected e-mail addresses; or opened, and the contents of the mailpiece e-mailed to recipient's selected e-mail addresses, and then the mailpiece may be delivered to the physical address specified by the recipient. The recipient may also have instructed the post to return the mail to the sender, to destroy the mail, or to recycle the paper in the mailpiece. Options 61 will also send the cost of the recipient's selected manner of delivery to bill recipient 66 so that data center 34 may inform the post to debit the recipient's account or send a bill to the recipient.

Figure 3:
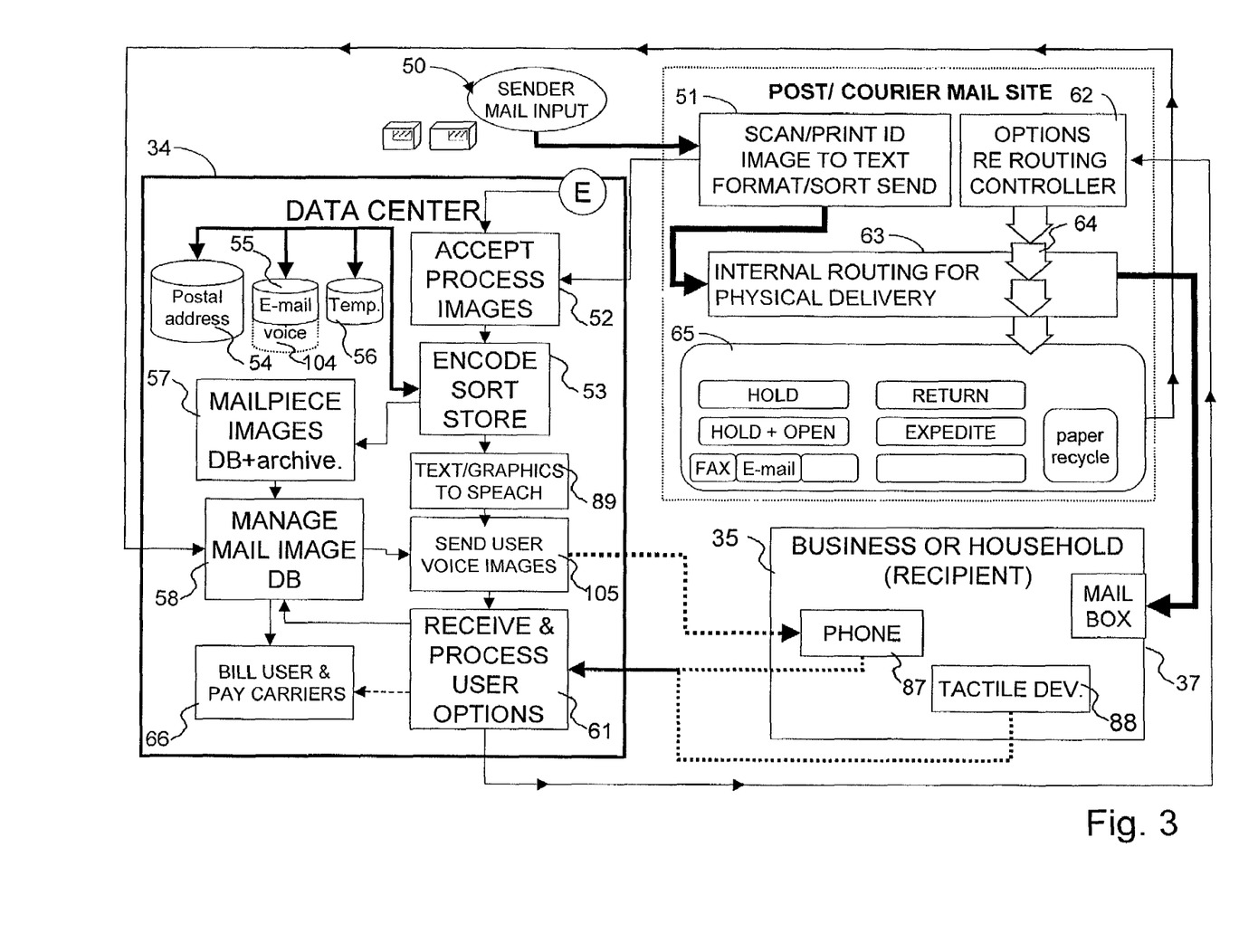
FIG. 3 is a drawing showing how this invention may be used by the post and/or a courier in the processing of flats and packages.

FIG. 3 is a drawing showing how this invention may be used by a post or courier in the processing of packages and flats. Packages and flats that are deposited with the carrier at 50 are scanned by scanner/coder 51. Scanner/coder 51 scans all of the information appearing on the face of the package or flat, i.e., (from FIG. 1D) the sender's address 41, the sender's phone number 44, the recipient's address 42 and courier symbology 43. The scanned information is coded, formatted and sorted, and the physical flat or package is sent to internal routing for physical delivery of the package or flat 63. The aforementioned information is transferred to accept process images 52, which is located at data center 34. Then the information is sent to encode, sort, store 53. At this point, the recipient's physical address is verified by checking postal address data base 54, the recipient's e-mail address is determined from e-mail data base 55 and the recipient's phone number and/or tactile communications device phone number are determined from voice data base 104. Tempory rary data base 56 is then searched to determine whether or not the recipient has left any forwarding addresses. Encode 53 then encodes and sorts the information obtained from data bases 54, 55, 56 and 104.

The aforementioned encoded and sorted information is stored in mail image archive data base 57. Then the package or flat image information is sent to manage mail image 58 where the various options and the costs associated therewith that the recipient may have for delivering the information contained in the package or flat are determined. Then the mail images and options that the recipient has for receiving the package or flat are sent to image to text and graphics to speech conversion process 89, where the information appearing on the face of the package or flat and the options the recipient has for receiving the package or flat are converted into speech. Then the speech is sent to voice images 105. Now the speech is transmitted to touch tone telephone 87 and/or tactile communications device 88, which is located at the recipient's business or household 35. It is well known in the art that device 88 may also be a personal computer combined with a Braille printer. The recipient may use device 36 (personal computer, facsimile machine, telephone, personal data assistant, etc.) located at the recipient's business or household 35 to inform receive and process recipient options 61, located at data center 34 of the manner in which the package or flat should be delivered. For instance, the recipient may want the package or flat physically delivered to the recipient's house faster or slower, or the package or flat physically redirected to the recipient's temporary address, or physically delivered to the recipient's agent, or physically delivered to the recipient's attorney, or physically returned to the mailer, or have the post open the package or flat and have the post e-mail or fax the contents of the package or flat to the recipient and/or parties designated by the recipient.

At this juncture, the recipient may inform options 61 via telephone 87 and/or tactile communications device 88 of the manner in which the recipient would like the package or flat processed. Options 61 will then inform the recipient via device 36 of the cost to the recipient to deliver the package or flat in the manner selected by the recipient. The recipient may then inform the carrier to deliver the package or flat in the manner selected by the recipient. The recipient's selected manner of package or flat delivery is forwarded to options rerouting controller 62. If the carrier specified time to deliver the package or flat has not been reached or the package or flat is at internally routing for physical processing 63, the package or flat will be sent to recipient options 64 and delivered in the manner selected by the recipient in route mail options 65. Then options 65 informs manage mail data base 58 to archive the image and also to notify bill sender and pay carriers 66 to bill the recipient and pay the carrier. At this point, the next package or flat image is ready to be processed.

The package or flat may then be delivered to the recipient at mail box 37 at a faster or slower rate than that selected by the sender; held by the courier for a specified amount of time and then delivered to an address specified by the recipient; opened, and the contents of the package or flat faxed to recipient's selected fax numbers; opened, and the contents of the package or flat faxed to recipient's selected fax numbers, and then the package or flat may be delivered to the physical address specified by the recipient; opened, and the contents of the package or flat e-mailed to recipient's selected e-mail addresses; or, opened, and the contents of the package or flat e-mailed to recipient's selected e-mail addresses, and then the package or flat may be delivered to the physical address specified by the recipient. The recipient may also have instructed the post or courier to return the mail to the sender or to destroy the contents of the package or flat or recycle the contents of the package or flat. Options 61 will also send the cost of the recipient's selected manner of delivery to bill recipient 66 so that the carrier may debit the recipient's account or send a bill to the recipient.

FIG. 4 is a drawing of major mailer site 90 that is used in the production of mailpieces for trays 82 (shown in FIG. 2). A mainframe computer 91 is located at site 90. Computer 91 performs preprocessing of the mailpiece by controlling the content and composition of the mailpiece as well as the address management, presortation postal requirements and postal process bar code requirements. Computer 91 is coupled to postal address data base 92, postal discount rules 93 and tray routes database 94. Computer 91 utilizes data base 92, rules 93 and data base 94 to instruct content printer 96 to print the material that is required for the mailing, i.e., information appearing on the face of the mailpiece and material that is going to be inserted into the mailpiece. Inserter and meter 97 inserts the material into the correct mailpiece, seals the mailpiece, applies the correct postage to the mailpiece, places the mailpiece in the proper tray 82, and prepares documentation for the mailpieces in tray 82. Mail face image scanner 98 scans the images on the face of each mailpiece as inserter and meter 97 is traying the mailpieces.

Then scanner 98 forwards the scanned images to mailpiece image store and forward 99. Computer 91 will cause tray label printer 101 to print a label according to mail traying process 100 for the tray 82 that inserter and meter 97 is filling when the tray 82 is filled and process 100 receives complete tray inputs from scanner 98. Then the trays 82 containing the mailpieces go to tray routing and booking process 102 and shipping process 103. When the trays 82 are in shipping process 103, postal discount acceptance printer 104 will be instructed by computer 91 to print the proper postal documentation for the mailpieces in tray 82. After process 103 places the proper documentation in trays 82, trays 82 are ready to be shipped to delivery bar code sorter/code printer 25 or sequence bar code sorter/code printer 26 (FIG. 2).

The above specification describes a new and improved method that enables a recipient who may be visually impaired to inform a carrier of the manner in which the recipient would like the mail delivered. It is realized that the above description may indicate to those skilled in the art additional ways in which the principles of this invention may be used without departing from the spirit. Therefore, it is intended that this invention be limited only by the scope of the appended claims.

What is claimed is:

1. A method that enables a recipient to inform a carrier of the manner in which the recipient would like the mail delivered, said method comprises the steps of:

depositing with the carrier mail containing the recipient's name and physical address and the sender's name and address;

capturing the name and physical address of the recipient and the sender in the form of an image;

transmitting the image to a data center where the image is processed by translating the image consisting of text and graphics to alphanumerics;

translating the name and physical address of the recipient into a telephone number;

utilizing the telephone number of the recipient and the translated image alphanumerics to inform the recipient of the expected delivery of the deposited mail via a tactile communication device;

if the recipient desires to destroy the mail, notifying the carrier by the recipient to destroy the mail, if the recipient does not want to destroy the mail, notifying the carrier of the manner in which the recipient would like the mail delivered;

delivering mail to the recipient in the manner specified by the recipient to the carrier; and charging the recipient for delivering mail to the recipient in the manner specified by the recipient to the carrier.

2. A method that enables a recipient to inform a carrier of the manner in which the recipient would like the mail delivered, said method comprises the steps of:

depositing with the carrier mail containing the recipient's name and physical address and the sender's name and address;

capturing the name and physical address of the recipient and the sender in the form of an image;

transmitting the image to a data center where the image is processed by translating the image consisting of text and graphics to alphanumerics;

translating the name and physical address of the recipient into a telephone number;

utilizing the telephone number of the recipient and the translated image alphanumerics to inform the recipient of the expected delivery of the deposited mail via a tactile communication device;

if the recipient desires to recycle the paper in the mail, notifying the carrier by the recipient to recycle the paper in the mail, if the recipient does not want to recycle the paper in the mail, notifying the carrier of the manner in which the recipient would like the mail delivered;

delivering mail to the recipient in the manner specified by the recipient to the carrier; and charging the recipient for delivering mail to the recipient in the manner specified by the recipient to the carrier.

* * * * *